(12) United States Patent
Lichtinger

(10) Patent No.: US 7,134,869 B2
(45) Date of Patent: *Nov. 14, 2006

(54) ROTARY DEVICE FOR A HORIZONTAL INJECTION MOLDING MACHINE

(75) Inventor: Peter Lichtinger, Fürstenfeldbruck (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/902,648

(22) Filed: Jul. 29, 2004

(65) Prior Publication Data

US 2005/0003040 A1 Jan. 6, 2005

Related U.S. Application Data

(63) Continuation of application No. 09/829,209, filed on Apr. 6, 2001, now Pat. No. 6,830,448, which is a continuation of application No. PCT/EP00/07562, filed on Aug. 4, 2000.

(30) Foreign Application Priority Data

Aug. 6, 1999 (DE) ................. 199 37 200

(51) Int. Cl.
*B29C 45/66* (2006.01)

(52) U.S. Cl. ........................... 425/576
(58) Field of Classification Search ............... 425/112, 425/127, 129.1, 574, 575, 576; 310/68 C
See application file for complete search history.

(56) References Cited

U.S. PATENT DOCUMENTS

| 3,838,961 | A | | 10/1974 | Yogosawa et al. | |
| 4,307,057 | A | * | 12/1981 | Hettinga | 425/576 |
| 4,330,257 | A | | 5/1982 | Rees et al. | |
| 4,408,981 | A | | 10/1983 | Brown | |
| 4,786,455 | A | | 11/1988 | Krishnakumar et al. | |
| 5,772,420 | A | * | 6/1998 | Holmes | 425/588 |
| 6,218,749 | B1 | * | 4/2001 | Nondahl et al. | 310/68 C |
| 6,830,448 | B1 | * | 12/2004 | Lichtinger | 425/576 |

FOREIGN PATENT DOCUMENTS

| DE | 22 50 002 | | 4/1974 |
| DE | 32 05 262 | A1 | 9/1982 |
| DE | 85 09 642 | U | 7/1985 |
| DE | 39 14 846 | | 11/1989 |
| DE | 43 13 951 | | 11/1993 |
| DE | 197 33 667 | A1 | 2/1999 |
| EP | 0 249 703 | A2 | 12/1987 |
| EP | 0 538 203 | | 4/1993 |
| EP | 0 794 045 | A1 | 9/1997 |
| EP | 0 895 848 | A | 2/1999 |
| EP | 0 922 556 | A1 | 6/1999 |
| GR | 2 300 142 | A | 10/1996 |
| JP | 62060618 | A | 3/1987 |

OTHER PUBLICATIONS

T-Line Toggle Injection Molding Machines (Cincinnati Milacron pamphlet) p. 7, Jan. 1982.*
Husky Annual Report, pp. 10 and 11, Sep. 1996.*

* cited by examiner

*Primary Examiner*—Tim Heitbrink
(74) *Attorney, Agent, or Firm*—Henry M. Feiereisen

(57) ABSTRACT

A rotary device for a horizontal injection molding machine includes a base plate and a rotary table supported on the base plate for rotation about a vertical rotation axis upon operation of a drive. The drive includes a pivot pin extending downwards from the rotary table and projecting through the base plate.

19 Claims, 5 Drawing Sheets

ROTARY DEVICE FOR A HORIZONTAL INJECTION MOLDING MACHINE

CROSS-REFERENCES TO RELATED APPLICATIONS

This application is a continuation of prior filed U.S. application Ser. No. 09/829,209, filed Apr. 6, 2001 now U.S. Pat. No.6,830,448, which in turn is a continuation of prior filed PCT International application no. PCT/EP00/07562, filed Aug. 4, 2000, which claims the priority of German Patent Application Serial No. 199 37 200.4, filed Aug. 6,1999.

BACKGROUND OF THE INVENTION

The present invention relates to a rotary device for a horizontal injection molding machine for turning mold portions or molded articles between the mold mounting plates about a vertical axis. The invention also relates to an injection molding machine equipped with such a rotary device.

An apparatus for holding and turning molds or mold parts in a horizontal injection molding machine is known, for example, from U.S. Pat. No. 4,330,257 and European Pat. No. EP 0 922 556 A1, with the horizontal injection molding machine having mold mounting plates between which a turret (mold center platen) is slideable in longitudinal direction of the machine and provided as mold carrier with prismatic cross section which is supported for rotation about an axis extending perpendicular to the longitudinal axis of the machine. In order to shift the turret in longitudinal axis of the machine, on the one hand, and to rotate the turret about an axis extending perpendicular to the longitudinal axis of the machine, a system is provided in which the turret is rotatably supported in carriers, with the carriers slideably guided and supported at least on both lower tie bars of the injection molding machine (U.S. Pat. No. 4,330,257) or on all four tie bars (European Pat. No. EP 0 922 556 A1). To permit a precise guidance of the carrier and of the attached turret, support and guiding elements are required which are of highly precise construction and sized in narrow tolerances and which are arranged at great distances from one another as a result of the system. Thus, this support reacts sensitively to temperature fluctuations, i.e. during cool-down period and accompanying shrinkage, the clearance in the bearings increases whereas during heating period and accompanying expansion there is a risk that the support and guiding elements get jammed on the tie bars. To prevent the latter, the tolerances in the support and guiding elements should not be too narrow, i.e. sized not too precisely. A further drawback resides in the fact that the tie bars are loaded by a significant weight (inadmissible bending) depending on the design of the turret and the carriers, and that the torques encountered during rotation of the turret must be absorbed entirely by the tie bars, resulting in particular during starting and braking of the rotational movement in significant stresses.

It would therefore be desirable and advantageous to provide an improved rotary device for horizontal injection molding machines, obviating prior art shortcomings. It would further be desirable and advantageous to provide an improved injection molding machine, equipped with a precisely supported and guided rotary device.

SUMMARY OF THE INVENTION

According to one aspect of the present invention, a rotary device for a horizontal injection molding machine, includes a base plate; a rotary table supported on the base plate for rotation about a vertical rotation axis; and drive means for rotating the rotary table, wherein the drive means includes a pivot pin extending downwards from the rotary table and projecting through the base plate.

The present invention resolves prior art problems by completely separating the guidance and the support of the rotary device from the tie bars. Thus, the tie bars are not unnecessarily exposed to stress, on the one hand, and the guidance and support can be dimensioned more precise compared to the prior art.

According to another feature of the present invention, the base plate has a substantially H-shaped, thereby establishing a stable support when the legs of the H-shaped base plate are sufficiently long, as well as allowing a simple withdrawal of a molded article into the free space between the legs of the H-shaped base plate. In connection with heavy mold center platens, it is advantageous to provide several linear guides and/or slideways and/or to so size the base plate as to reach to an area outside the zone of the mold mounting plates. By means of transport brackets and ring bolts, a complete stack mold can be dropped in closed state into the area between the mold mounting plates and mounted onto the rotary table, with centering elements being suitably provided for centering the center platen upon the rotary table.

According to another aspect of the present invention, a horizontal injection molding machine includes a machine bed defining a longitudinal axis, a first mold mounting plate fixedly secured onto the machine bed, a second mold mounting plate supported on the machine bed and movable relative to the first mold mounting plate, a rotary device arranged between the first and second mold mounting plates and including a base plate, a rotary table supported on the base plate for rotation about a vertical axis, and a drive mechanism for rotating the rotary table, and a shifting mechanism for displacing the rotary device in a direction parallel to the longitudinal axis, wherein the base plate and the second mold mounting plate are guided on different guides.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
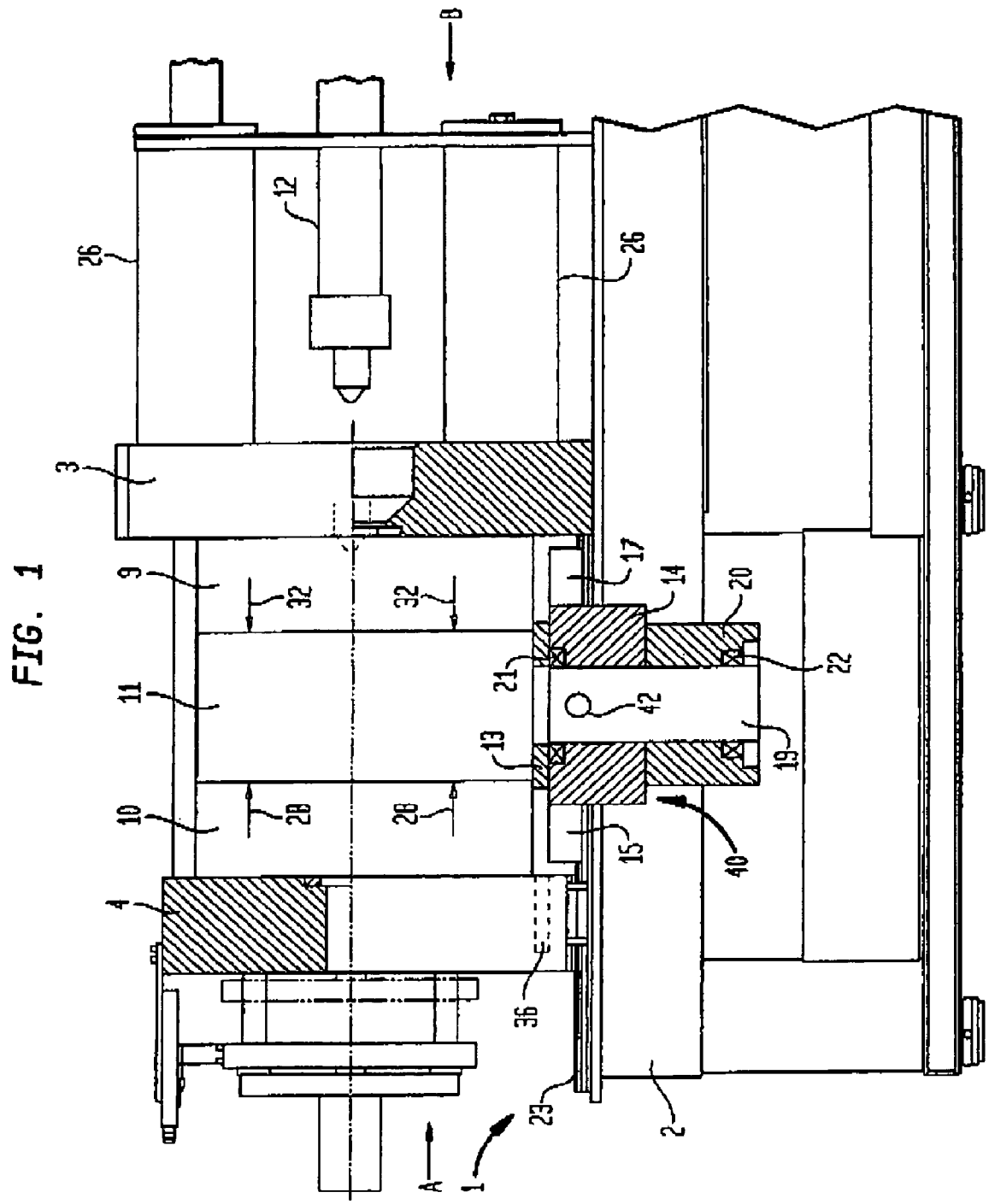
FIG. 1 is a partially sectional side view of an injection molding machine equipped with a stack mold and a rotary device according to the invention.

Throughout all the Figures, same or corresponding elements are generally indicated by same reference numerals.

The invention will now be described in more detail by way of example with reference to a horizontal injection molding machine, generally designated by reference numeral 1 and having a machine bed 2 for support of a stack mold with a fixed mold mounting plate 3 carrying a mold portion 9 and a moving mold mounting plate 4 which carries a displaceable mold portion 10. The moving mold mounting plate 4 is guided on a machine bed guidance 23, 24, 25 and pulled by tie bars 5, 6, 7, 8 (FIG. 5) relative to the stationary mold mounting plate 3. Hydraulic cylinders 26 are shown for movement of the tie bars 5, 6, 7, 8 (only hydraulic cylinders 26 for the tie bars 6 and 8 are visible in FIGS. 1 and 5). Placed between the mold portions 9, 10 is a center platen 11, denoted in the following as swivel plate. The swivel plate 11 and the mold portions 9, 10 are each provided with, not shown, form recesses in confronting relationship to define respective cavities. Defined between the fixed mold portion 9 and the confronting side of the swivel plate 11 is the first phase of the stack mold, whereas the second phase of the stack mold is provided between the moving mold portion 10 and the confronting side of the swivel plate 11. Injection of material in the first phase is implemented by an injection unit 12 associated to the fixed mold portion 9, whereas the second phase injection is realized by a, not shown, generally L-shaped injection unit which is attached to the moving mold portion 10.

The swivel plate 11 is secured on a rotary device according to the invention, generally designated by reference numeral 40. The rotary device 40 includes a generally rectangular rotary table 13 for attachment of the swivel plate 11. The rotary table 13 is rotatably supported on a base plate 14 of substantially H-shaped configuration, as shown in particular in FIG. 4, thereby defining rear legs 15, 16, forward legs 17, 18 and a croaspiece 50 interconnecting the rear and forward legs 15, 16, 17, 18. The crosspiece 50 and the rotary table 13 are so configured that a molded article is able to drop downwards into a free space between the legs 15, 16, 17, 18 of the base plate 14, whereby the legs 15, 16, 17, 18 of the H-shaped base plate 14 extend to an area in proximity to the mold mounting plates 3, 4 at formation of a slight distance (safety distance), when the stack mold is closed, as shown in FIG. 1 with respect to the rear legs 15, 16 As shown in particular in FIG. 5, the tie bars 5, 6, 7, 8 extend above the base plate 14.

In case of heavy center platens 11, additional, not shown, guides may be provided for support of the base plate 14, whereby the guides project underneath the mold mounting plates 3, 4 to an area outside thereof. In this case, the legs 15, 16, 17, 18 of the H-shaped base plate 14 may be made of wider size, or the space between the legs of the H-shaped base plate 14 is more or less omitted on one or both sides of the swivel plate 11 so that the base plate 14 becomes effectively continuous in this area.

A pivot pin 19 (rotor) points downwards from the rotary table 13 and is rotatably supported in a respective stator 20 and the base plate 14. The rotary table 13 is rotated on the machine bed 2 by a suitable drive mechanism, which includes e.g. a ring gear 43 mounted to the rotary table 13. The ring gear 43 is in mesh with a pinion 44 and driven by a motor 49, e.g. hydraulic motor or electric motor, as shown in particular in FIGS. 5 and 6.

Figure 3:
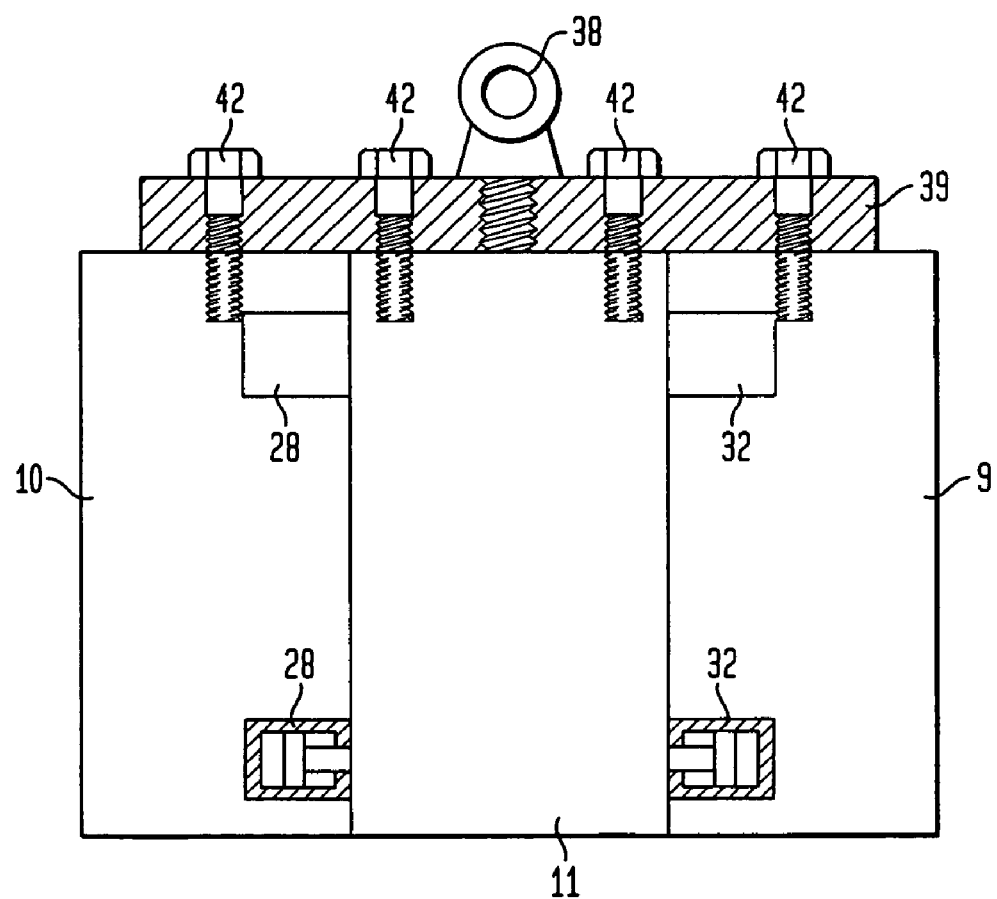
FIG. 3 is a schematic illustration of the stack mold with transport brackets, ring bolts and release cylinders.
Figure 5:
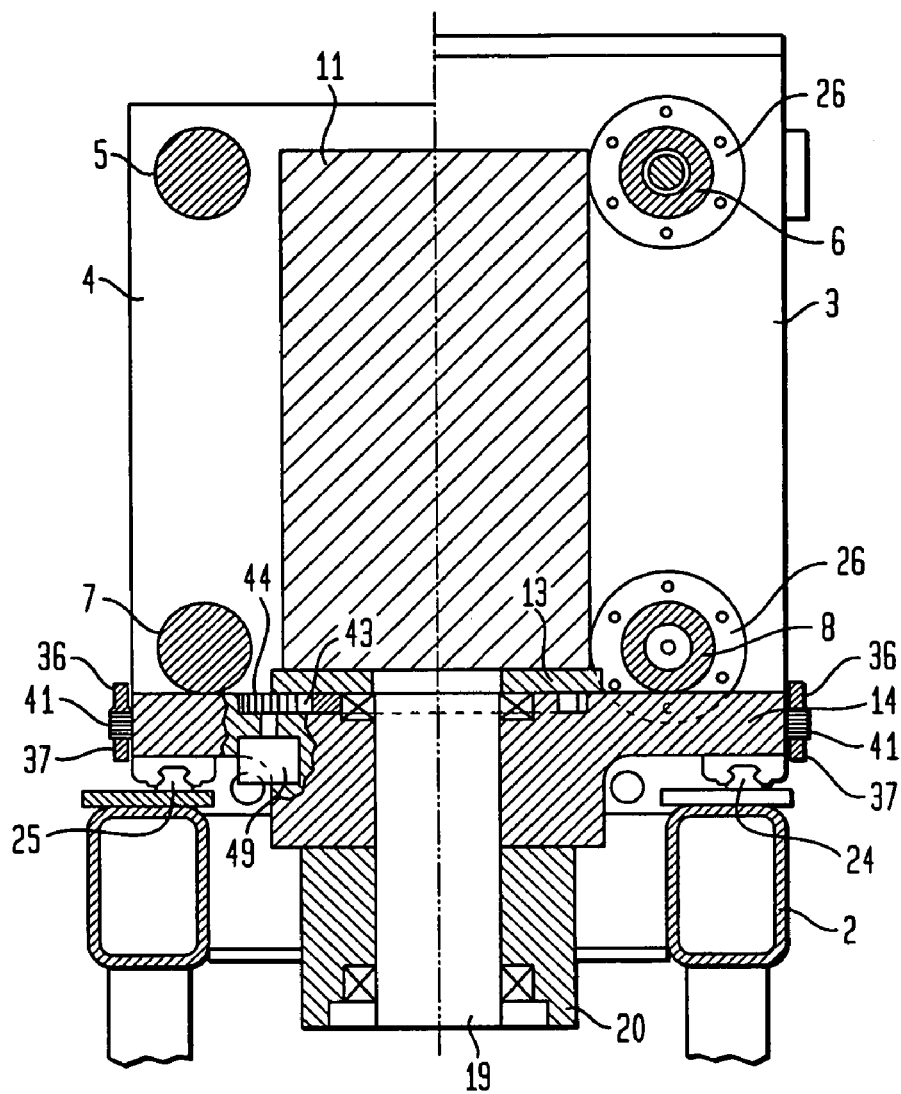
FIG. 5 is a sectional view of the stack mold, taken along the line IV—IV in FIG. 4, with the left half depicting a view in the direction of the arrow A in FIG. 1, whereas the right half depicts a view in the direction of the arrow B in FIG. 1.
Figure 6:
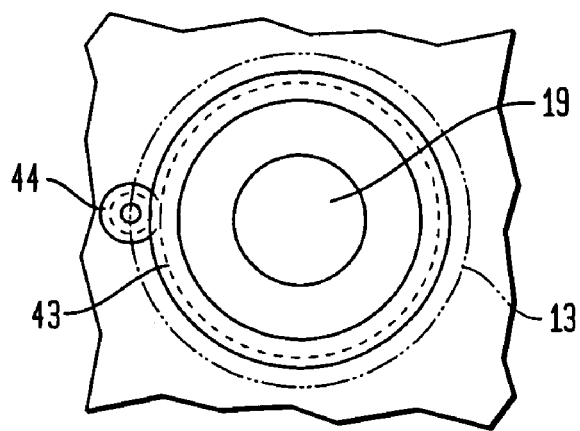
FIG. 6 is a plan view of a drive mechanism for rotating the rotary table.

The base plate 14 is supported on stable linear guides 23 (or on slideways) on the machine bed 2, with the machine bed 2 including stable linear rails or slideways 24, 25 for engagement of the complementary underside of the base plate 15. Disposed between the swivel plate 11 and the mold portion 9 in the first phase of the stack mold are at least two, preferably four, hydraulic release cylinders 28 in symmetric disposition, and disposed at the partition plane between the swivel plate 11 and the mold portion 10 in the second phase of the stack mold are at least two, preferably four, hydraulic release cylinders 32 in symmetric disposition, as shown in FIGS. 3 and 5. The release cylinders 18, 32 generate during opening movement a parallel, simultaneous short stroke as additional support for a parallel opening of the stack mold.

Figure 2:
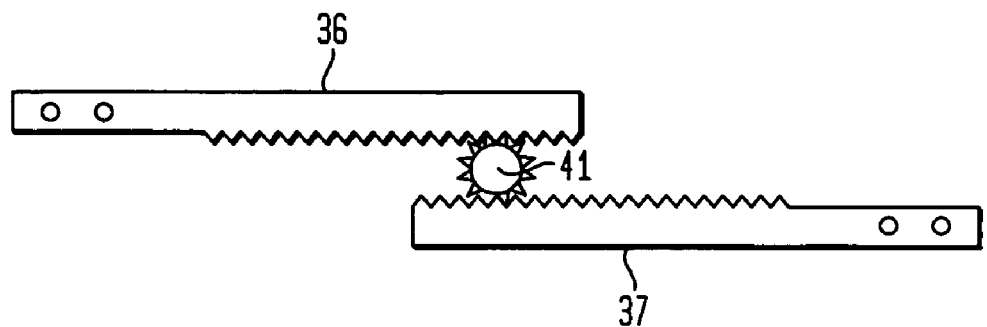
FIG. 2 is a schematic illustration of a shifting mechanism for moving the rotary device in longitudinal direction of the machine.
Figure 4:
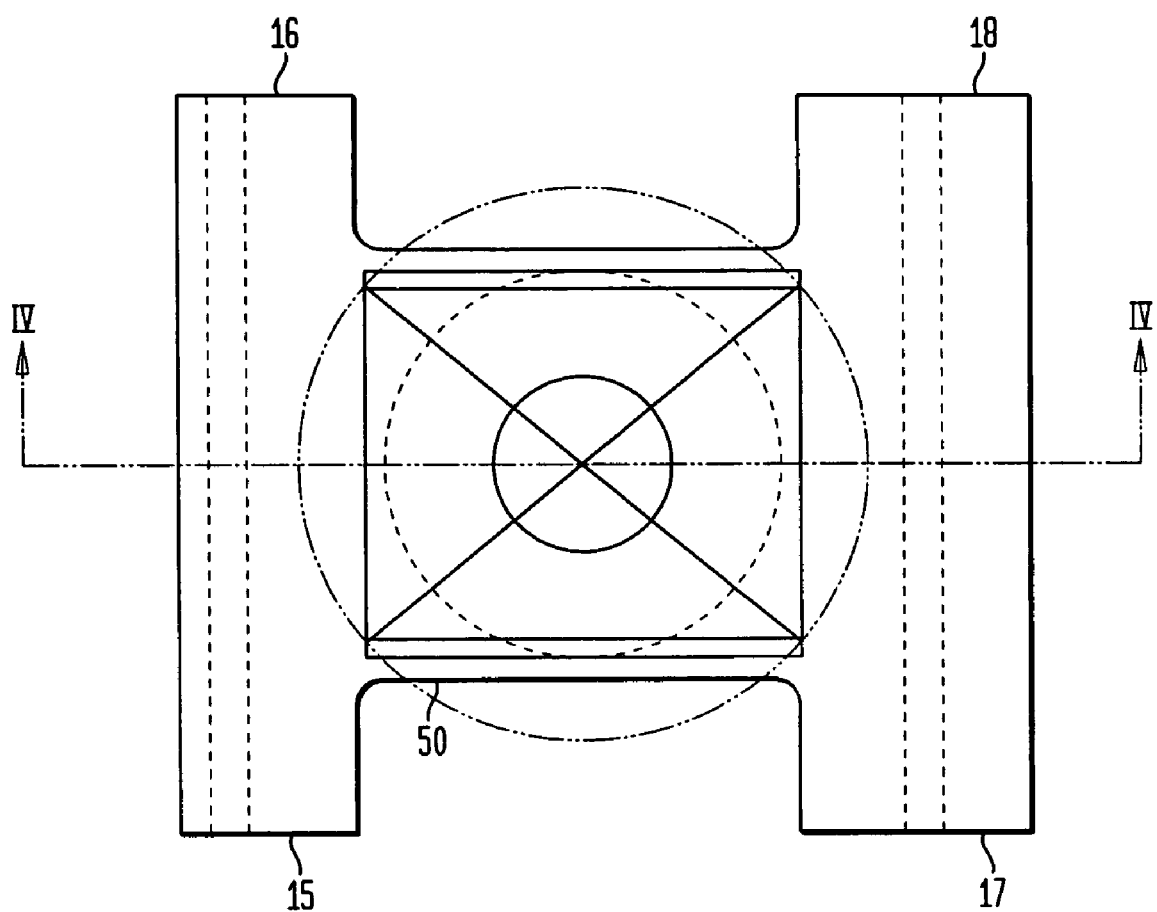
FIG. 4 is a top view of the rotary device according to the invention.

The movement of the rotary device 40 in longitudinal direction of the machine bed 2 is implemented by a shifting mechanism comprised of racks or steep-threaded spindles 36, 37, articulated on both sides to the mold mounting plates 9, 10, and gears 41 which are respectively attached to the base plate 14, as shown in particular in FIGS. 2 and 5. As shown in FIG. 4, the finished molded articles can be expelled into the free space between the legs 15, 16, 17, 18 of the H-shaped base plate 14 and carried off by a, not shown, subjacent conveyor belt. Thus, additional handling systems for withdrawal of the molded articles can be omitted. Transport brackets 39 and ring bolts 38 (FIG. 3) allow a simple assembly and disassembly of the entire stack mold as a unit. Of course, it is also possible to assemble and disassemble the mold components separately, when each mold component has ring bolts 38, and the transport brackets 39 are loosened.

Securement of the mold center platen 11 on the rotary table 13 is realized by providing in the lower region of the center platen 11 one or more grooves and by providing aligned bores in the portion of the center platen 11 that is placed on the rotary table 13, so that screw fasteners, not shown, can be screwed through these bores into the rotary table 13, with the screw heads being accessible via the grooves. Although not shown in detail, the rotary table 13 may be provided with centering members to allow proper alignment of the center platen 11.

Figure 7:
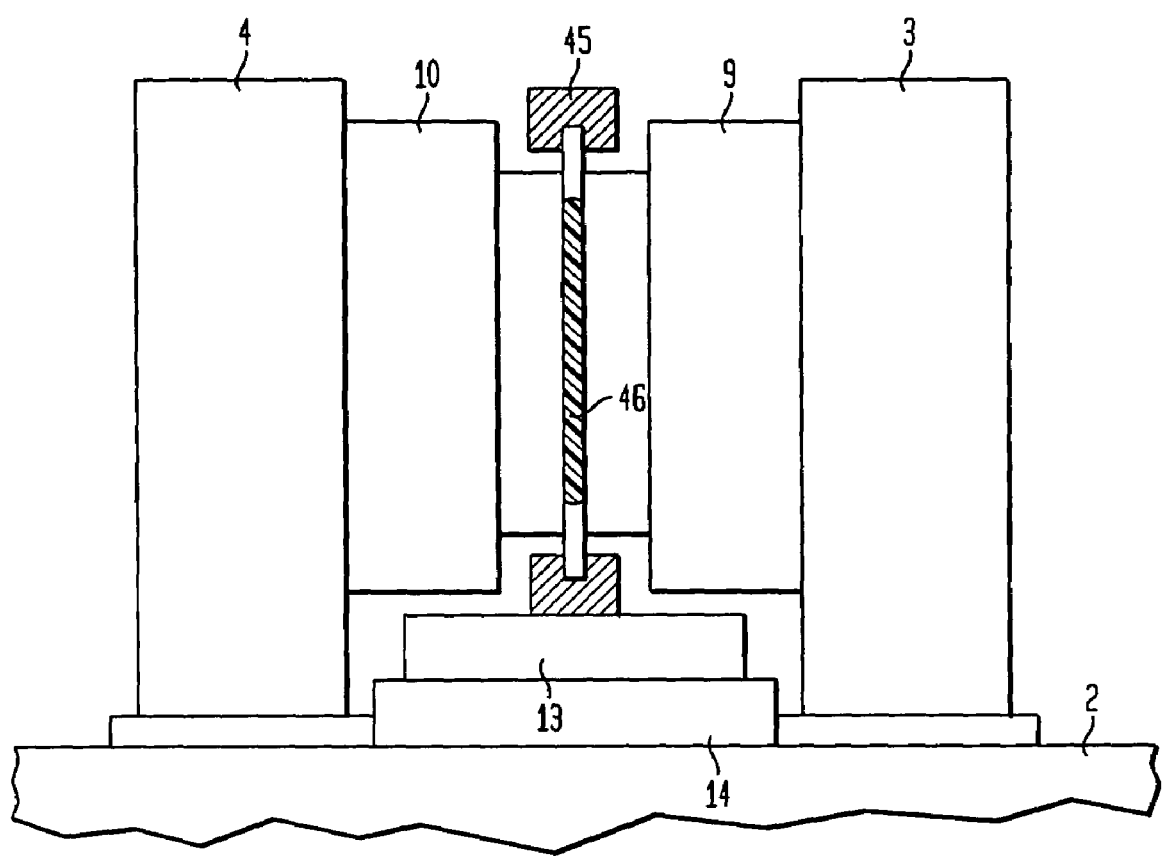
FIG. 7 a schematic side view of another embodiment of an injection molding machine equipped with a rotary device according to the invention.

Instead of a mold carrier of a stack mold, it is also possible to attach on the rotary device according to the invention other elements. For example, as shown in FIG. 7, a holding frame 45, i.e. a so-called index frame or a so-called index plate, may be provided for a molded article 46, to permit a turning of this molded article 46 from a first phase to a second phase between the mold portions 9 and 10

It is also possible to transmit a media such as water, oil, air, and electric signals between the center platen 11 and the rotary table 13, e.g. via a line 42.

While the invention has been illustrated and described as embodied in a rotary device for a horizontal injection molding machine, it is not intended to be limited to the details shown since various modifications and structural changes may be made without departing in any way from the spirit of the present invention.

What is claimed is:

1. A rotary device for a horizontal injection molding machine, comprising a base plate constructed in the absence of a passageway for a tie bar between fixed and moving mold mounting plates of the injection molding machine; a rotary table supported on the base plate for rotation about a vertical rotation axis; drive means for rotating the rotary table, wherein the drive means includes a pivot pin extending downwards from the rotary table and projecting through the base plate; and a shifting mechanism comprised of two racks with interposed gear for moving the base plate in longitudinal direction.

2. The rotary device of claim 1, wherein the base plate has a substantially H-shaped configuration.

3. The rotary device of claim 1, wherein the base plate has a center of gravity, said vertical axis extending through the center of gravity of the base plate.

4. The rotary device of claim 1, and further comprising guide means selected from the group consisting of linear guide and slideways for slideably supporting the base plate.

5. The rotary device of claim 1, wherein the base plate is disposed between confronting mold mounting plates of a mold of the injection molding machine and so sized as to be spaced from the mold mounting plates, when the mold is closed.

6. The rotary device of claim 1, wherein the base plate is disposed between confronting mold mounting plates of a mold of the injection molding machine and so sized as to project underneath the mold mounting plates into an area outside of the mold mounting plates, when the mold is closed.

7. The rotary device of claim 1, wherein the base plate is disposed between confronting mold mounting plates of a mold of the injection molding machine, and further comprising shifting means, connecting the base plate to the mold mounting plates, for displacing the base plate in a longitudinal direction, said shifting means including a member selected from the group consisting of a rack, a spindles, a steep-threaded spindle, and a hydraulic cylinder.

8. The rotary device of claim 1, wherein the racks are articulated to mold mounting plates of the injection molding machine, and the gear is secured to the base plate.

9. The rotary device of claim 1, and further comprising guide means selected from the group consisting of linear guide and slideways for preventing the base plate from tilting.

10. The rotary device of claim 1, wherein the drive means includes a ring gear mounted to the rotary table and a motor, selected from the group consisting of electric motor and hydraulic motor, for driving a gear in mesh with the ring gear on the rotary table.

11. The rotary device of claim 1, and further comprising a stator disposed underneath the base plate, said pivot pin being rotatably supported in the base plate and the stator.

12. A horizontal injection molding machine, comprising:
a machine bed defining a longitudinal axis;
a first mold mounting plate fixedly secured onto the machine bed;
a second mold mounting plate supported on the machine bed and movable relative to the first mold mounting plate;
a rotary device arranged between the first and second mold mounting plates and including a base plate, a rotary table supported on the base plate for rotation about a vertical axis, and drive means for rotating the rotary table; and
shifting means for displacing the rotary device in a direction parallel to the longitudinal axis
wherein the base plate and the second mold mounting plate are guided on different guides.

13. The horizontal injection molding machine of claim 12, wherein the shifting means so couple the rotary device to the first and second mold mounting plates that a travel of the second mold mounting plate is followed by a movement of the rotary device, said shifting means including a member selected from the group consisting of a rack, a spindles, a steep-threaded spindle, and a hydraulic cylinder.

14. The horizontal injection molding machine of claim 12 being a stack mold with a center part disposed between the first and second mold mounting plates, and secured to the rotary table, with the center part being a member selected from the group consisting of center platen and prismatic mold carrier.

15. The horizontal injection molding machine of claim 14, and further comprising attachment means for securing the center part on the rotary table.

16. The horizontal injection molding machine of claim 14, and further comprising means for transmission of media between the center part and the rotary table.

17. The horizontal injection molding machine of claim 16, wherein the media includes an element selected from the group consisting of water, oil, air, and electric signals.

18. The horizontal injection molding machine of claim 14, wherein the center part defines with one mold portion a partition plane and with the other mold portion a partition plane, and further comprising at least two hydraulic release cylinders provided in an area of each of the partition planes.

19. The horizontal injection molding machine of claim 18, wherein four hydraulic release cylinders are provided in the area of each of the partition planes.

* * * * *